US012602151B2

(12) United States Patent
Lee

(10) Patent No.: US 12,602,151 B2
(45) Date of Patent: Apr. 14, 2026

(54) MOBILE ELECTRONIC DEVICE AND OPERATION INTERFACE ADJUSTMENT METHOD THEREOF BASED ON HANDEDNESS STATUS AND FREQUENCY OF USE

(71) Applicant: ASUSTeK COMPUTER INC., Taipei (TW)

(72) Inventor: Chang-Tai Lee, Taipei (TW)

(73) Assignee: ASUSTeK COMPUTER INC., Taipei City (TW)

( * ) Notice: Subject to any disclaimer, the term of this patent is extended or adjusted under 35 U.S.C. 154(b) by 255 days.

(21) Appl. No.: 18/502,073

(22) Filed: Nov. 5, 2023

(65) Prior Publication Data

US 2024/0289008 A1 Aug. 29, 2024

(30) Foreign Application Priority Data

Feb. 23, 2023 (TW) ................................. 112106577

(51) Int. Cl.
G06F 3/0488 (2022.01)
G06F 3/04847 (2022.01)

(52) U.S. Cl.
CPC ........ G06F 3/04847 (2013.01); G06F 3/0488 (2013.01)

(58) Field of Classification Search
CPC ............... G06F 3/04847; G06F 3/0488; G06F 3/04817; G06F 3/0482; G06F 3/04886
See application file for complete search history.

(56) References Cited

U.S. PATENT DOCUMENTS

| | | | |
|---|---|---|---|
| 10,838,541 B2 | 11/2020 | Hung et al. | |
| 2010/0085317 A1* | 4/2010 | Park ..................... | G06F 3/04817 |
| | | | 715/810 |
| 2014/0082514 A1* | 3/2014 | Sivaraman ............ | G06F 3/0416 |
| | | | 715/745 |
| 2015/0242117 A1* | 8/2015 | Nakashima ......... | G06F 3/04847 |
| | | | 715/773 |
| 2015/0370423 A1* | 12/2015 | Liu ..................... | G06F 3/04886 |
| | | | 715/811 |
| 2017/0103732 A1* | 4/2017 | Schantz ................ | G06F 1/1684 |
| 2018/0004386 A1* | 1/2018 | Hinckley .............. | G06F 3/0416 |
| 2018/0329605 A1 | 11/2018 | Venkateswararao | |

FOREIGN PATENT DOCUMENTS

| | | |
|---|---|---|
| CN | 103761086 | 4/2014 |
| CN | 106293332 | 1/2017 |
| CN | 110516424 | 11/2019 |
| TW | I715058 | 1/2021 |

* cited by examiner

*Primary Examiner* — Rinna Yi
(74) *Attorney, Agent, or Firm* — JCIPRNET

(57) ABSTRACT

A mobile electronic device and an operation interface adjustment method thereof are provided. The method is adapted to the mobile electronic device including a touch screen and includes the following steps. An application (app) is launched. A handedness status is determined. A display position of each of a plurality of control options in an operation interface of the app is determined according to the handedness status and a frequency of use of each of the control options of the app. The operation interface including the control options is displayed via a touch screen according to the display position of each of the control options in the operation interface.

18 Claims, 7 Drawing Sheets

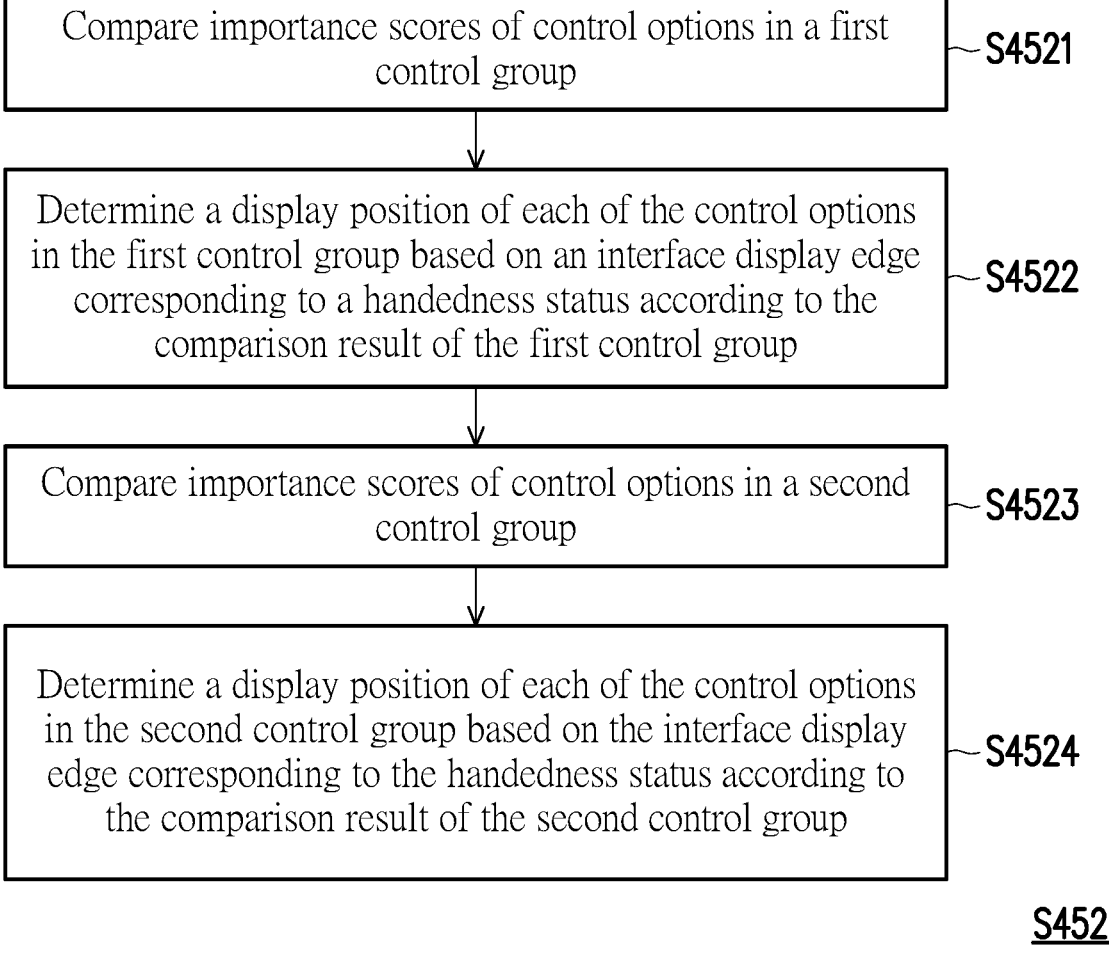

Compare importance scores of control options in a first control group ~S4521

Determine a display position of each of the control options in the first control group based on an interface display edge corresponding to a handedness status according to the comparison result of the first control group ~S4522

Compare importance scores of control options in a second control group ~S4523

Determine a display position of each of the control options in the second control group based on the interface display edge corresponding to the handedness status according to the comparison result of the second control group ~S4524

MOBILE ELECTRONIC DEVICE AND OPERATION INTERFACE ADJUSTMENT METHOD THEREOF BASED ON HANDEDNESS STATUS AND FREQUENCY OF USE

CROSS-REFERENCE TO RELATED APPLICATION

This application claims the priority benefit of Taiwan application serial no. 112106577, filed on Feb. 23, 2023. The entirety of the above-mentioned patent application is hereby incorporated by reference herein and made a part of this specification.

BACKGROUND OF THE INVENTION

Field of the Invention

The invention relates to a mobile electronic device and an operation interface adjustment method thereof.

Description of Related Art

The touch screen of a general mobile electronic device may display a user interface containing a plurality of control options for a user to input control commands. However, the control options are displayed at fixed positions in the user interface, and it is more difficult for the user to touch the control options that are farther from the thumb of the holding hand when operating with one hand, thus causing inconvenience in use.

SUMMARY OF THE INVENTION

The disclosure provides an operation interface adjustment method adapted for a mobile electronic device including a touch screen, and the method includes the following steps. An application (app) is launched. A handedness status is determined. A display position of each of a plurality of control options in an operation interface of the app is determined according to the handedness status and a frequency of use of each of the control options of the app. The operation interface including the control options is displayed via a touch screen according to the display position of each of the control options in the operation interface.

The disclosure further provides a mobile electronic device including a touch screen, an image capture device, a storage device, and a processor. The storage device records a plurality of commands, the processor is coupled to the touch screen, the image capture device, and the storage device, and executes the commands to perform the following steps. An app is launched. A handedness status is determined. A display position of each of a plurality of control options in an operation interface of the app is determined according to the handedness status and a frequency of use of each of the control options of the app. The touch screen is controlled to display the operation interface including the control options according to the display position of each of the control options in the operation interface.

Based on the above, in the disclosure, the display position of each of the control options in the operation interface of the app may be determined according to the dominant hand status and the frequency of use of each of the control options. As a result, the display position of each of the control options of the app in the operation interface may be dynamically adjusted according to the user's operation habits. In this way, the frequently-used control options of the user may be displayed at a position that is convenient for the hand holding the mobile electronic device to touch, thereby significantly improving the operation convenience of the app.

BRIEF DESCRIPTION OF THE DRAWINGS

FIG. 5 is a flowchart of determining display positions of control options in an operation interface of an embodiment of the disclosure.

DESCRIPTION OF THE EMBODIMENTS

Figure 1:
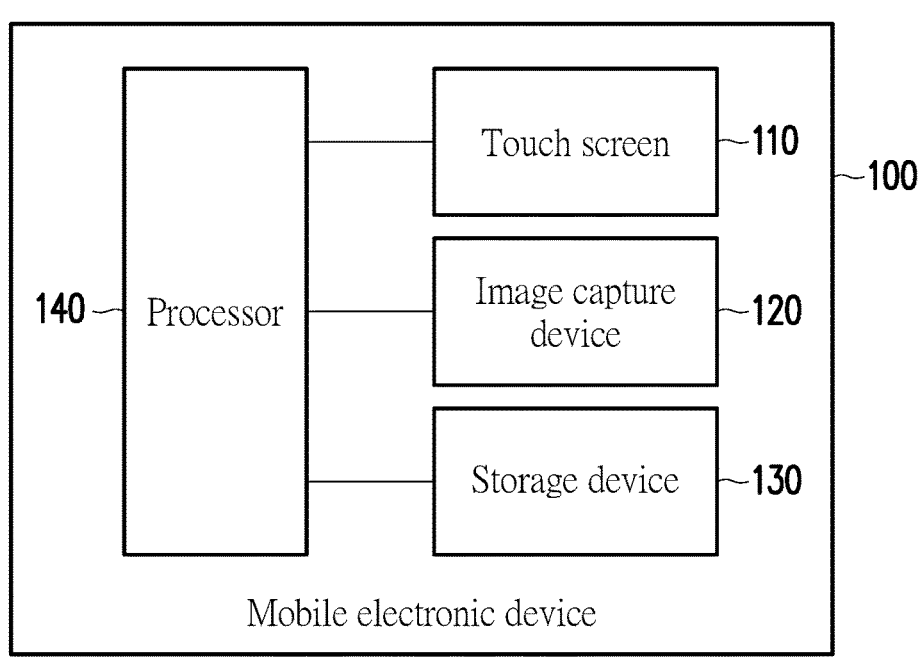
FIG. 1 is a schematic diagram of a mobile electronic device of an embodiment of the disclosure.

Reference will now be made in detail to the exemplary embodiments of the invention, and examples of the exemplary embodiments are illustrated in the accompanying drawings. Wherever possible, the same reference numerals are used in the drawings and descriptions to refer to the same or like parts. The embodiments are only a part of the invention, and do not disclose all possible implementation modes of the invention. Rather, the embodiments are merely examples of devices and methods within the scope of the invention.

Referring to FIG. 1, a mobile electronic device 100 is, for example, an electronic device having a photo function and a touch function such as a smart phone, a tablet computer, a game console, a digital camera, and the disclosure is not limited thereto. The mobile electronic device 100 includes a touch screen 110, an image capture device 120, a storage device 130, and a processor 140. The processor 140 is coupled to the touch screen 110, the image capture device 120, and the storage device 130, and the functions thereof are described as follows.

The touch screen 110 is a display device integrating a touch detection element, and may provide both display and input functions. The display device is, for example, a liquid-crystal display (LCD), a light-emitting diode (LED) display, a field-emission display (FED), an organic LED (OLED), or other types of displays, and the disclosure is not limited in this regard. The touch detection element is disposed on the display device, and the sensing elements are configured to receive a touch operation. The touch detection element may be, for example, a capacitive touch detection element, a surface acoustic wave touch detection element, an electromagnetic touch detection element, a near-field imaging touch detection element, and the like.

The image capture device 120 is configured to capture an image or a video, and may include one or a plurality of lenses, image sensors, and other members. The image sensor may include a sensing element, such as a charge-coupled device (CCD), a complementary metal-oxide semiconductor (CMOS) element, or other elements, and the disclosure is not limited in this regard. The lens may gather the imaging light onto the image sensing element to achieve the object of capturing an image.

The storage device 130 is configured to store data such as files, images, commands, program codes, software modules, and may be, for example, any type of fixed or removable random-access memory (RAM), read-only memory (ROM), flash memory, hard disk, or other similar devices, integrated circuits, or a combination thereof.

The processor 140 is, for example, a central processing unit (CPU), an application processor (AP), or other programmable general-purpose or special-purpose microprocessors, digital signal processors (DSPs), programmable controllers, application-specific integrated circuits (ASICs), programmable logic devices (PLDs), graphics processing units (GPUs), or other similar devices, or a combination of the devices. The processor 140 may execute the program codes, software modules, commands, etc. recorded in the storage device 130 to implement the operation interface adjustment method of an embodiment of the disclosure. The software modules may be broadly interpreted as meaning commands, command sets, codes, program codes, programs, applications, software packages, threads, programs, functions, and the like.

In some embodiments, when the user uses an application (app), the touch screen 110 displays the operation interface containing the app. The app is, for example, a camera app, a social communication app, a game app, or other types of apps, and the disclosure is not limited thereto. The operation interface includes a plurality of control options, and the user may control the app to perform various functions by performing touch operations on the control options displayed on the touch screen 110. For example, assuming that the app is a camera app, the user may control the camera app to perform various photo-related functions via the control options of the camera app, such as mode setting, photo parameter setting, or photo trigger and so on. The control options are generally displayed at the periphery of the preview frame in the operation interface of the camera app. In an embodiment of the disclosure, the display positions of the control options of the app in the operation interface may be determined according to the frequency of use of the control options, so that the display position of each of the control options in the operation interface of the app may be dynamically adjusted, so as to respond to the usage scenario of manipulating the mobile electronic device 100 with one hand to take pictures or record videos. The following is an embodiment to illustrate the detailed steps of the mobile electronic device 100 executing the operation interface adjustment method.

Figure 2:
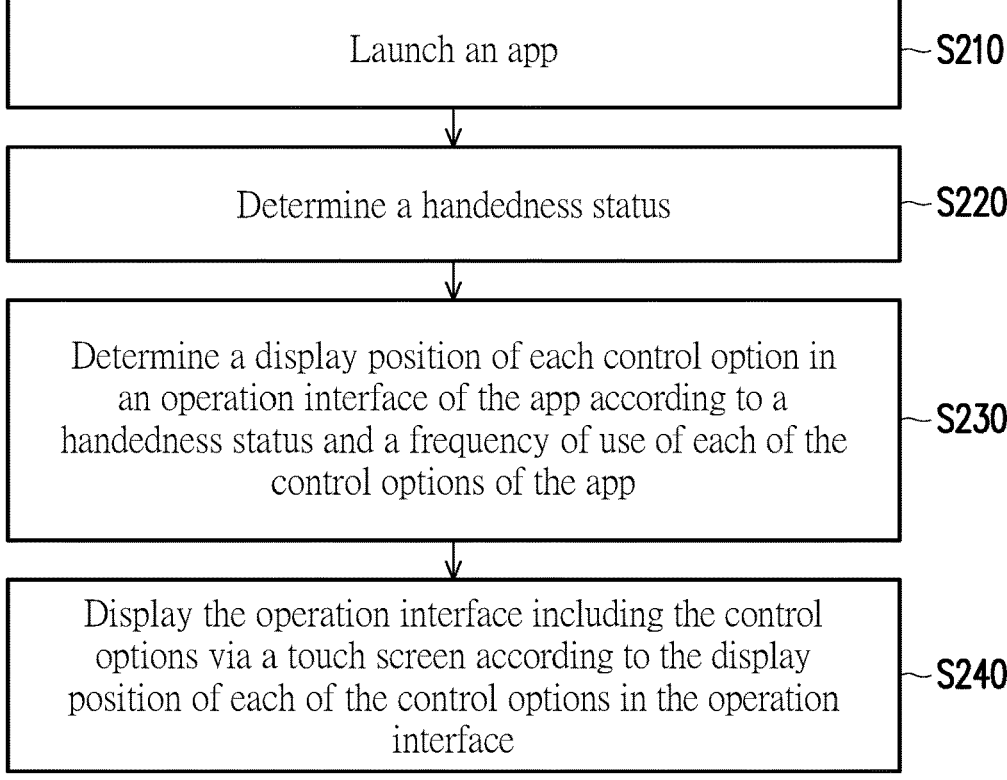
FIG. 2 is a flowchart of an operation interface adjustment method of an embodiment of the disclosure.

FIG. 2 is a flowchart of an operation interface adjustment method of an embodiment of the disclosure. Referring to FIG. 1 and FIG. 2, the method of the present embodiment is applicable to the mobile electronic device 100 in the above embodiment. The detailed steps of the operation interface adjustment method of the present embodiment are described below in combination with various elements in the mobile electronic device 100.

In step S210, the processor 140 launches an app. For example, the user may select an app icon (such as a camera icon) displayed on the desktop or in the function menu to launch the app. In response to receiving an operation command to launch the app, the processor 140 launches the app.

In step S220, the processor 140 determines a handedness status. The handedness status includes a left-hand control status or a right-hand control status. That is to say, after the app is launched, the processor 140 determines whether the user is holding the mobile electronic device 100 with the right hand or the left hand. In some embodiments, the processor 140 may determine the handedness status according to a sensor (not shown) of the mobile electronic device 100. Alternatively, in some embodiments, the processor 140 may determine the handedness status according to the user's touch operation on the touch screen 110. Alternatively, the processor 140 may configure a setting interface to receive the user's setting of the handedness status.

In step S230, the processor 140 determines a display position of each of a plurality of control options in an operation interface of the app according to the handedness status and a frequency of use of each of the control options of the app. For example, assuming that the app is a camera app, the control options of the app may include mode setting, photo parameter setting, image browsing, lens switching, photo trigger, and so on. Specifically, different users have different operation habits for the same app, so the control options commonly used by different users may be different when using the app. For example, since different users have different photographing habits and preferences, different users may adopt different commonly-used control options when using the camera app. In an embodiment of the disclosure, the display positions of the control options of the app in the operation interface may be determined according to the frequency of use of the control options.

In some embodiments, the processor 140 may sort the frequency of use of each of the control options, and arrange each of the control options at a corresponding layout position on the operation interface according to the sorting result. More specifically, the control options of the app may include a first control option and a second control option. When the frequency of use of the first control option is higher than the frequency of use of the second control option, the display position of the first control option is the first layout position closer to the thumb of the dominant hand, and the display position of the second control option is the second layout position farther from the thumb of the dominant hand.

In some embodiments, the processor 140 may perform a weighted operation on the frequency of use of each of the control options to obtain the importance score of each of the control options, and arrange each of the control options at a corresponding layout position on the operation interface according to the importance score of each of the control options. More specifically, the control options of the app may include a first control option and a second control option. When the importance score of the first control option is higher than the importance score of the second control option, the display position of the first control option is the first layout position closer to the thumb of the dominant hand, and the display position of the second control option is the second layout position farther from the thumb of the dominant hand.

Therefore, since each of the control options may be arranged in the operation interface according to the frequency of use, some of the control options that users use frequently are displayed near the display position of the thumb of the dominant hand, in order to make it easier for the thumb of the dominant hand to touch the commonly used control options when the user uses the dominant hand for one-handed control. In addition, the display positions of the control options may be dynamically changed according to the user's operation habits.

5

Figure 3:
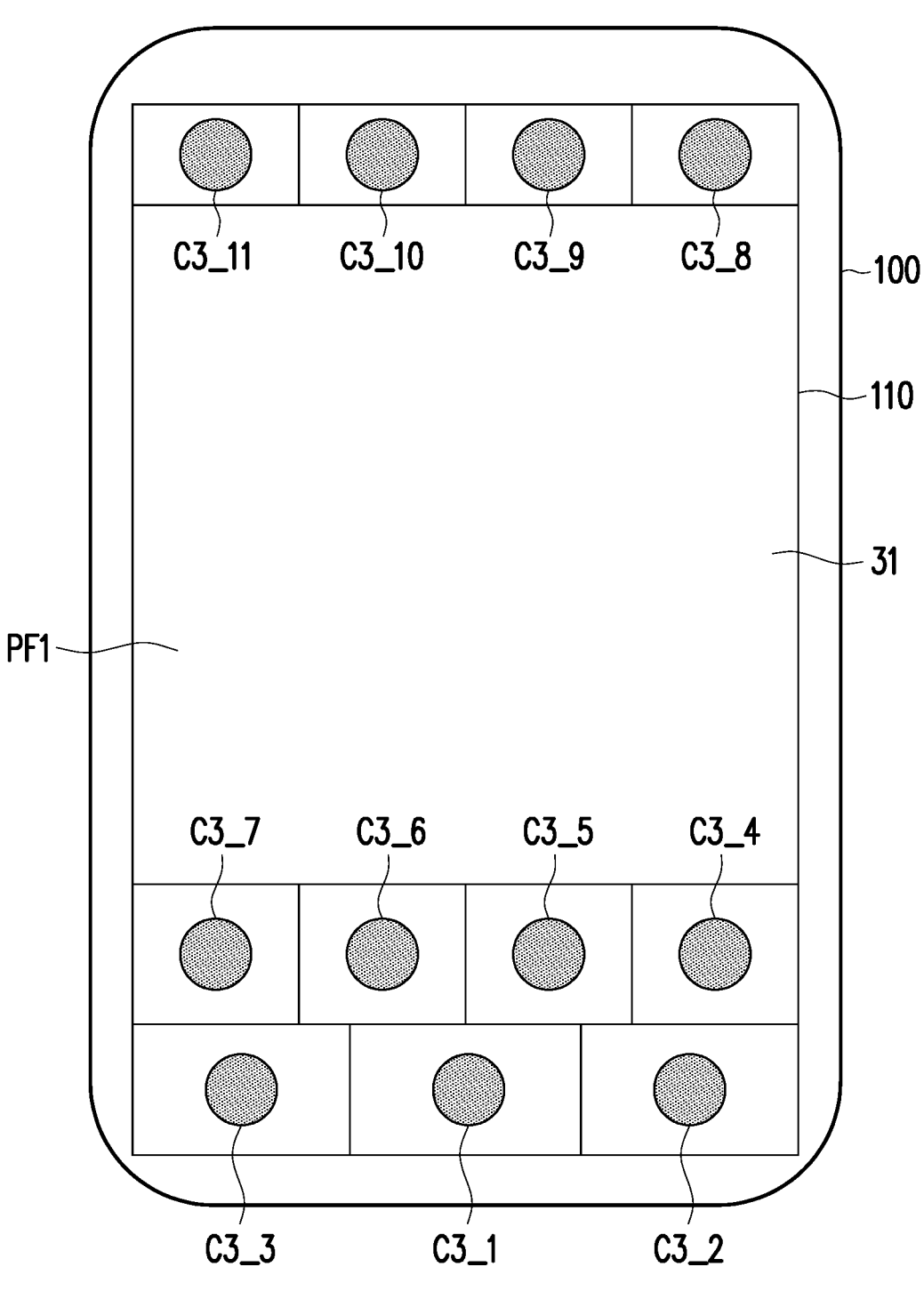
FIG. 3 is a schematic diagram of an operation interface of an app of an embodiment of the disclosure.

In step S240, the processor 140 displays the operation interface including the control options via the touch screen 110 according to the display position of each control option in the operation interface. Assuming that the app is a camera app, the touch screen 110 may display an operation interface including the control options and a preview frame. The preview frame may be continuously captured by the image capture device 120 and continuously displayed in the operation interface of the camera app. For example, FIG. 3 is a schematic diagram of an operation interface of a camera app of an embodiment of the disclosure. Referring to FIG. 3, the touch screen 110 displays an operation interface 31 of a camera app. The operation interface 31 includes a preview frame PF1 and a plurality of control options C3-1 to C3_11. The control options C3-1 to C3-11 may be presented by icons or texts. The display positions of the control options C3-1 to C3-11 in the operation interface 31 may be determined according to the respective frequencies of use of the control options C3-1 to C3_11. Specifically, the operation interface 31 includes a plurality of layout positions configured to display the control options C3-1 to C3_11, and the layout positions are located at both sides (such as the upper side and the lower side) of the preview frame PF1. The processor 140 may respectively arrange the control options C3-1 to C3-11 on the layout positions according to the respective frequencies of use of the control options C3-1 to C3_11.

It should be noted that at the initial stage of use, the user may not be familiar with the operation interface, and may tentatively click on the control options to understand the corresponding functions thereof. In order to prevent the tentative manipulations from affecting the display positions of the control options, the processor 140 may perform a weighting operation on the frequencies of use of the control options. Alternatively, the processor 140 adjusts the display positions of the control options according to the recorded frequencies of use only when the number of times the app is launched reaches a default value. Embodiments are listed below for clarity.

Figure 4:
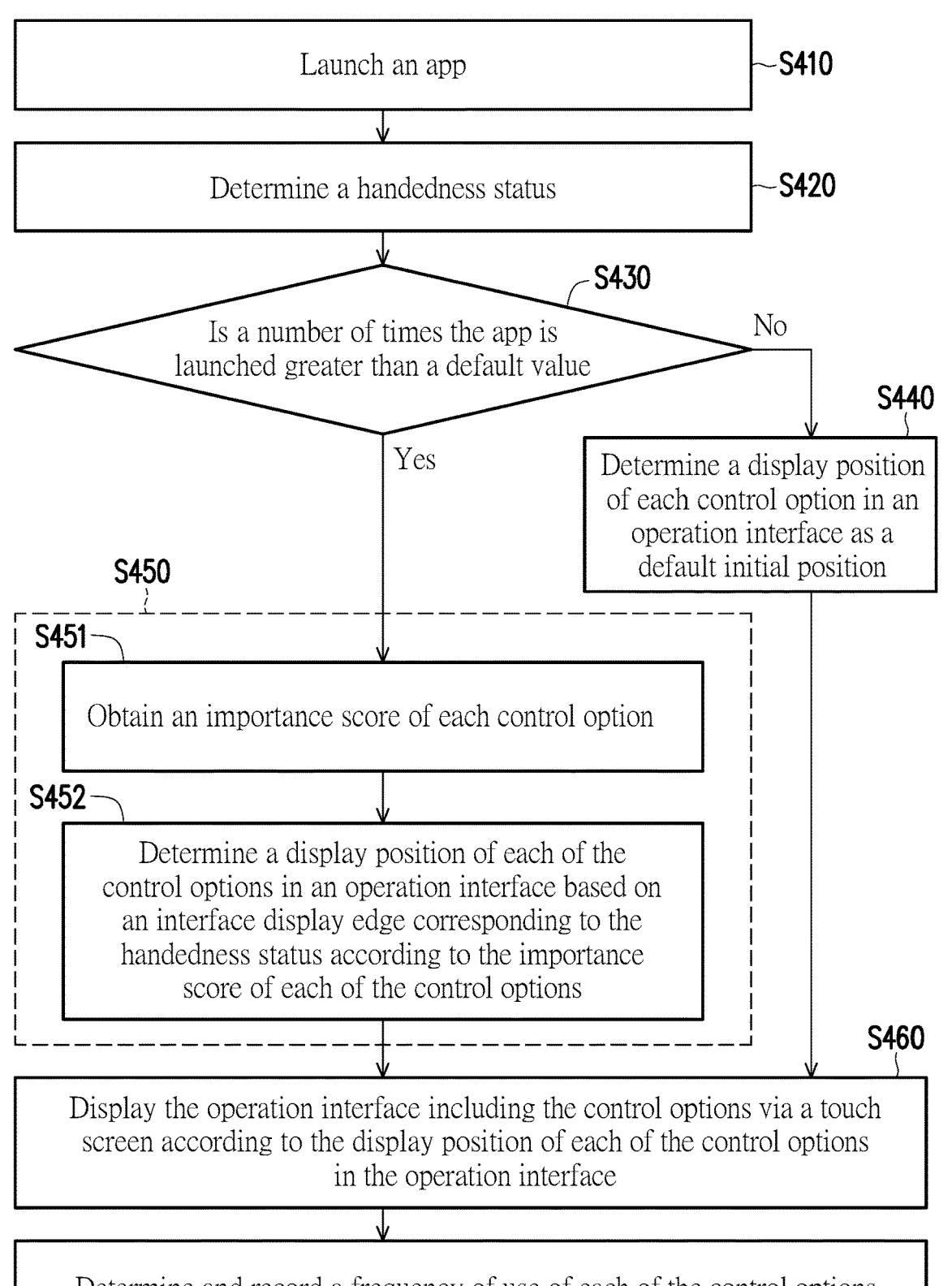
FIG. 4 is a flowchart of an operation interface adjustment method of an embodiment of the disclosure.

FIG. 4 is a flowchart of an operation interface adjustment method of an embodiment of the disclosure. Referring to FIG. 1 and FIG. 4, the method of the present embodiment is applicable to the mobile electronic device 100 in the above embodiment. The detailed steps of the operation interface adjustment method of the present embodiment are described below in combination with various elements in the mobile electronic device 100.

In step S410, the processor 140 launches an app. In step S420, the processor 140 determines a handedness status. The implementation details of the steps are as provided in the above description, and are not repeated herein.

In step S430, the processor 140 determines whether the number of times the app is launched is greater than a default value. This default value may be 1, 2, or other integers. In other words, whenever the user launches the app, the processor 140 may add one to the number of times the app is launched, and then determine whether the number of times the app is launched is greater than a default value.

If the determination of step S430 is negative, in step S440, when the number of times the app is launched is not greater than the default value, the processor 140 determines the display position of each of the control options in the operation interface as the default initial position. That is to say, the processor 140 may control the touch screen 110 to display the default operation interface of the app when the number of times the app is launched is not greater than the default value. Each of the control options in the default operation interface is respectively located at a default initial position.

Figure 6A:
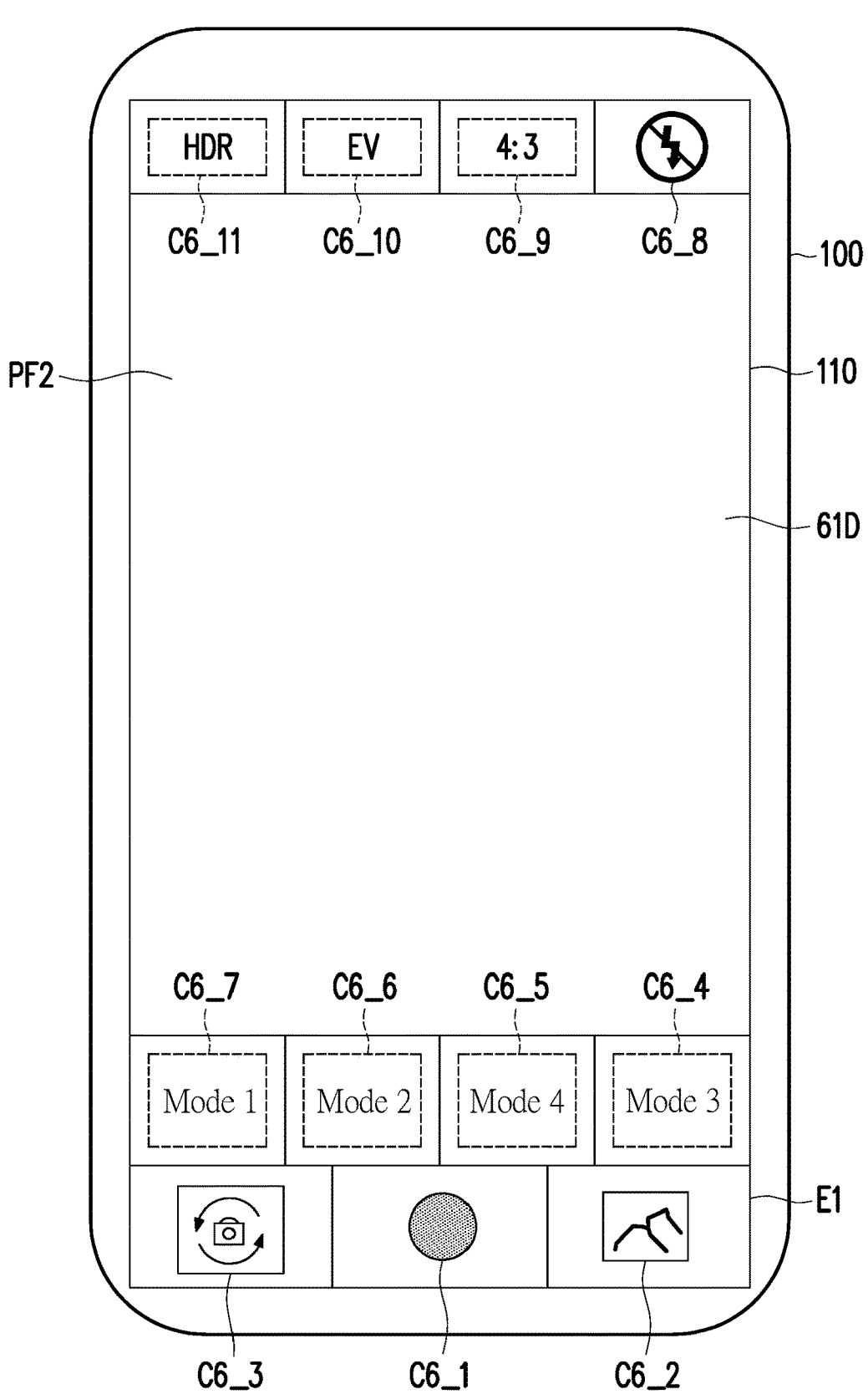
FIG. 6A is a schematic diagram of a default operation interface of an embodiment of the disclosure.

For example, FIG. 6A is a schematic diagram of a default operation interface of an embodiment of the disclosure. However, in order to clearly illustrate the principles of the disclosure, FIG. 6A takes the camera app as an example for illustration, but the disclosure is not limited thereto. Referring to FIG. 6A, after the camera app is launched, when the number of times the camera app is launched is not greater than the default value, the touch screen 110 displays a default operation interface 61D, and the default operation interface 61D includes control options C6-1 to C6-11 and a preview frame PF2. In more detail, the default operation interface 61D may include a landscape area, a main functions control bar, a mode list control bar, and a setting list control bar. The preview frame PF2 is displayed in the landscape area. The control options C6-1 to C6-3 are arranged at the left and right and displayed in the main functions control bar. The control options C6-4 to C6-7 are arranged at the left and right and displayed in the mode list control bar. The control options C6-8 to C6-11 are arranged at the left and right and displayed in the setting list control bar. Each of the control options C6-1 to C6-11 in the default operation interface 61D is respectively located at a default initial position. However, the representative illustrations and representative texts of the control options C6-1 to C6-11 shown in FIG. 6A are only exemplary illustrations, and are not intended to limit the disclosure.

Moreover, if step S430 is determined as yes, in step S450, when the number of times the app is launched is greater than the default value, the processor 140 determines the display position of each of the control options in the operation interface according to the handedness status and the frequency of use of each of the control options of the app. That is to say, the processor 140 may control the touch screen 110 to display an adjusted operation interface different from the default operation interface when the number of times the app is launched is greater than the default value. The display position of each of the control options in the adjusted operation interface is arranged according to the frequency of use of each of the control options.

In an embodiment, it is assumed that the default value is 1. When the user launches the app for the first time, the touch screen 110 displays the default operation interface of the app. When the user launches the app not for the first time, the touch screen 110 displays the adjusted operation interface of the app.

In addition, in the embodiment shown in FIG. 4, step S450 may be implemented as steps S451 to S452. In step S451, when the number of times the app is launched is greater than the default value, the processor 140 obtains the importance score of each of the control options. The importance score of each of the control options is determined based on the frequency of use of each of the control options is used. In different embodiments, the processor 140 may correspondingly generate the importance score of each of the control options according to the frequency of use of each of the control options via table lookup, function calculation, or other methods.

In some embodiments, the processor 140 may determine the importance score of each of the control options according to the default weight corresponding to each of the control options and the frequency of use of each of the control options. In some embodiments, the processor 140 may perform a weighting operation on the frequency of use of each of the control options. The importance score of each of the control options may include the product of the default weight and the frequency of use. Or, in some other embodiments, the processor 140 may input the default weight and the frequency of use of a certain control option into a default function to generate the importance score of the control option. The importance score of each of the control options is increased with the frequency of use.

For example, Table 1 lists the default weights and frequencies of use of a plurality of control options #1 to #11, but Table 1 is only an exemplary description, and is not intended to limit the disclosure.

thumb to select control options with higher importance scores under one-handed operation.

In addition, it should be noted that, in some embodiments, since the importance score may be generated according to the frequency of use and the default weight, the importance score of each of the control options may prevent a significant increase in response to false touches or tentative clicks that occur from a lack of familiarity with the operation interface at the initial stage of operation. In this way, the control options may be prevented from being displayed at positions

TABLE 1

| | Control option | | | | | | | | | | |
|---|---|---|---|---|---|---|---|---|---|---|---|
| | Control option #1 | Control option #2 | Control option #3 | Control option #4 | Control option #5 | Control option #6 | Control option #7 | Control option #8 | Control option #9 | Control option #10 | Control option #11 |
| Frequency of use | 5 | 1 | 3 | 2 | 3 | 2 | 0 | 3 | 0 | 0 | 1 |
| Default weight | W1 | W2 | W3 | W4 | W5 | W6 | W7 | W8 | W9 | W10 | W11 |

In step S452, the processor 140 determines the display position of each of the control options in the operation interface based on an interface display edge corresponding to the handedness status according to the importance score of each of the control options. In some embodiments, the processor 140 may arrange the control options based on the interface display edge corresponding to the handedness status according to the sorting of the importance scores of the control options. That is, the processor 140 may compare the importance scores of the control options, and determine the display positions of the control options in the display operation interface according to the comparison result.

Specifically, in some embodiments, the processor 140 may, according to the comparison result between the importance score of the first control option and the importance score of the second control option, determine that the display position of the first control option is the first layout position and the display position of the second control option is the second layout position based on the interface display edge. When the importance score of the first control option is greater than the importance score of the second control option, the distance between the first layout position and the interface display edge is less than the distance between the second layout position and the interface display edge. Therefore, the distance between a control option having a smaller importance score and the interface display edge corresponding to the handedness status is greater than the distance between another control option having a greater importance score and the same interface display edge.

Furthermore, when the handedness status is the left-hand control status, the interface display edge is the left display edge of the touch screen 110. When the handedness status is the right-hand control status, the interface display edge is the right display edge of the touch screen 110. When the user holds the mobile electronic device 100 with one hand, their thumb is located at the left side or the right side of the touch screen 110. In the single-hand operation situation, when the right hand holds the mobile electronic device 100, the thumb of the right hand is closer to the right display edge of the touch screen 110. When the left hand holds the mobile electronic device 100, the thumb of the left hand is closer to the left display edge of the touch screen 110. Therefore, by arranging control options having larger importance scores closer to the interface display edge corresponding to the handedness status, the user may more readily use their that do not conform to the operation habits due to accidental touches or tentative clicks from a lack of familiarity with the operation interface.

Moreover, in some embodiments, the processor 140 may group the plurality of control options of the app into a plurality of control groups respectively corresponding to the plurality of control bars, and then compare the importance scores of the control options in the respective control groups. Then, the processor 140 may respectively determine the display positions of one or a plurality of control options in each of the control groups on each of the control bars according to the comparison result of each of the control groups. Specifically, in some embodiments, step S452 may be implemented as steps S4521 to S4524 in FIG. 5.

Referring to FIG. 5, in step S4521, the processor 140 compares the importance scores of the control options in the first control group. In step S4522, the processor 140 determines the display position of each of the control options in the first control group based on the interface display edge corresponding to the handedness status according to the comparison result of the first control group.

In some embodiments, the first control group in the plurality of control groups includes a first control option and a second control option. That is, the first control option and the second control option belong to the first control group in the control groups. The processor 140 may, according to the comparison result between the importance score of the first control option and the importance score of the second control option, determine that the display position of the first control option is the first layout position and the display position of the second control option is the second layout position based on the interface display edge. The first layout position and the second layout position are located on the first control bar in the operation interface.

In step S4523, the processor 140 compares the importance scores of the control options in the second control group. In step S4524, the processor 140 determines the display position of each of the control options in the second control group based on the interface display edge corresponding to the handedness status according to the comparison result of the second control group.

In some embodiments, the second control group in the plurality of control groups includes a third control option and a fourth control option. That is, the third control option and the fourth control option belong to the second control group in the control groups. The processor 140 determines that the display position of the third control option is the third layout position and the display position of the fourth control option is the fourth layout position based on the interface display edge according to another comparison result between the importance score of the third control option and the importance score of the fourth control option. The third layout position and the fourth layout position are located on the second control bar in the operation interface. In some embodiments, the display height of the first control bar is different from the display height of the second control bar. That is, the first control bar may be located above or below the second control bar.

Figure 6B:
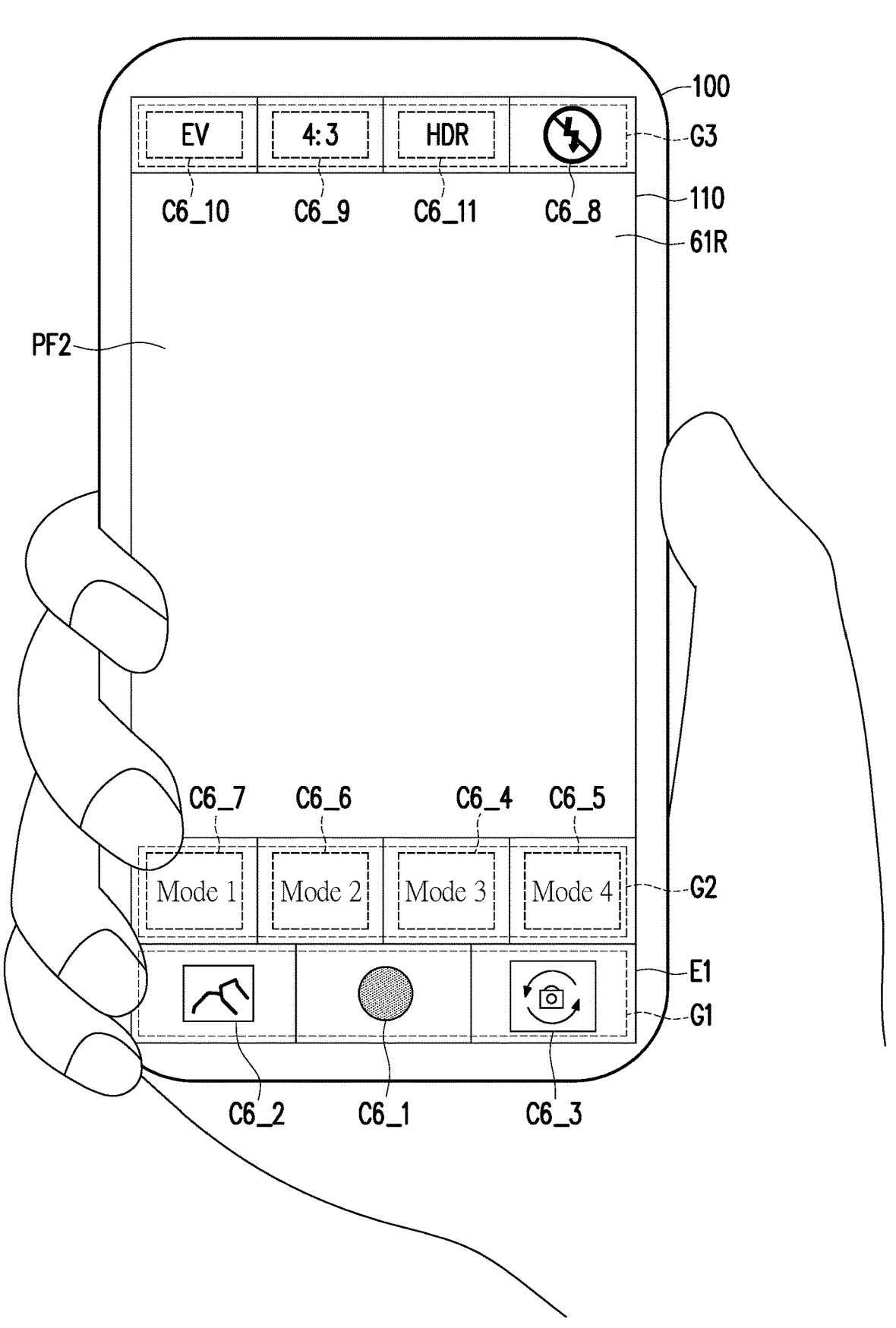
FIG. 6B is a schematic diagram of an operation interface corresponding to a right-hand control status of an embodiment of the disclosure.

For example, FIG. 6B is a schematic diagram of an operation interface corresponding to a right-hand control status of an embodiment of the disclosure. However, in order to clearly illustrate the principles of the disclosure, FIG. 6B takes the camera app as an example for illustration, but the disclosure is not limited thereto. Please refer to FIG. 6B, the frequency of use of Table 1 is taken as an example to continue the description. The control options #1 to #11 in Table 1 may respectively be the control options C6-1 to C6-11 in FIG. 6B in sequence. For example, the control option #1 is the control option C6_1, the control option #2 is the control option C6_2, and so on. When the number of times the camera app is launched is greater than the default value and the handedness status is the right-hand control status, the touch screen 110 may display an operation interface 61R.

In detail, the control options C6-1 to C6-11 may be grouped into three control groups G1, G2, and G3. The control group G1 corresponding to the main functions control bar includes the control options C6-1 to C6_3. The control option C6-1 is photo trigger. The control option C6-2 is image browsing. The control option C6-3 is lens switching. The control group G2 corresponding to the mode list control bar includes the control options C6-4 to C6_7. The control options C6-4 to C6-7 are respectively different photographing modes, for example, portrait mode, photography, video recording, panoramic shooting, or time-lapse photography and so on. The control group G3 corresponding to the setting list control bar includes the control options C6-8 to C6_11. The control options C6-8 to C6-11 are respectively different shooting parameter settings, such as white balance setting, flash light setting, aspect ratio setting, or high dynamic range setting, and so on.

The processor 140 may compare the importance scores of the control options C6-1 to C6-3 first. It should be noted that the control option C6-1 is to use photo trigger every time a photo is taken or a video is recorded, so may be displayed at a fixed position. In this example, the control option C6-1 is displayed in the center of the main functions control bar. In addition, the processor 140 compares the importance score of the control option C6-2 with the importance score of the control option C6_3. Referring to Table 1, assuming that the importance score of the control option C6-3 is greater than the importance score of the control option C6_2, the processor 140 determines that the display position of the control option C6-3 is the first layout position and the display position of the control option C6-2 is the second layout position. The distance between the first layout position where the control option C6-3 is located and an interface display edge E1 is less than the distance between the second layout position where the control option C6-2 is located and the interface display edge E1.

In addition, the processor 140 compares the respective importance scores of the control options C6-4 to C6_7.

Referring to Table 1, by sorting the respective importance scores of the control options C6-4 to C6_7, the processor 140 may decide to display the control option C6-5 having the largest importance score on the layout position closest to the interface display edge E1 on the mode list control bar. Moreover, the processor 140 may arrange the control option C6_4, the control option C6_6, and the control option C6-7 on the mode list control bar in order toward the left according to the sorting result of the importance scores of the control options C6-4 to C6_7.

Similarly, the processor 140 compares the respective importance scores of the control options C6-8 to C6_11. Referring to Table 1, by sorting the respective importance scores of the control options C6-8 to C6_11, the processor 140 may decide to display the control option C6-8 having the largest importance score on the layout position closest to the interface display edge E1 on the setting list control bar. Moreover, the processor 140 may arrange the control option C6_11, the control option C6_9, and the control option C6-10 on the setting list control bar in order toward the left according to the sorting result of the importance scores of the control options C6-8 to C6_11.

Figure 6C:
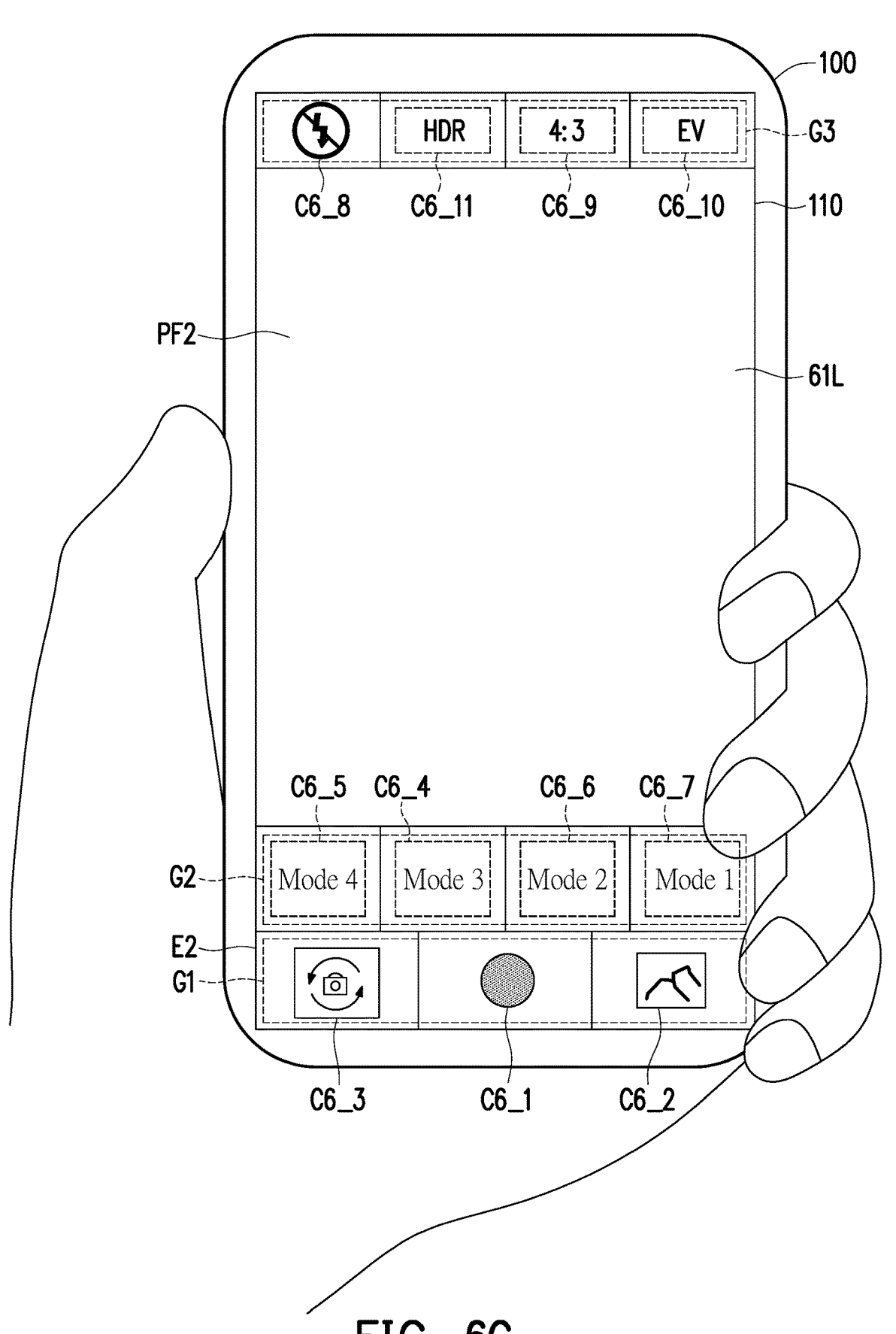
FIG. 6C is a schematic diagram of an operation interface corresponding to a left-hand control status of an embodiment of the disclosure.

Moreover, FIG. 6C is a schematic diagram of an operation interface corresponding to a left-hand control status of an embodiment of the disclosure. However, in order to clearly illustrate the principles of the disclosure, FIG. 6C takes the camera app as an example for illustration, but the disclosure is not limited thereto. Referring to FIG. 6C, when the number of times the camera app is launched is greater than the default value and the handedness status is the left-hand control status, the touch screen 110 may display an operation interface 61L. According to the detailed description of FIG. 6B, those having ordinary skill in the art may undoubtedly understand the configuration principle of the operation interface 61L with reference to FIG. 6B and FIG. 6C, and details are not repeated herein. Importantly, the closer the control option is to the interface display edge E2 on the same control bar, the higher the importance score is.

Returning to FIG. 4, in step S460, the processor 140 displays the operation interface including the control options and the preview frame via the touch screen 110 according to the display position of each of the control options in the operation interface. Please refer to FIG. 6A and FIG. 6B at the same time, as the number of times the camera app is launched is increased to the default value, in response to the fact that the handedness status is the right-hand status, the touch screen 110 may be adjusted from displaying the default operation interface 61D to the adjusted display operation interface 61R. Please refer to FIG. 6A and FIG. 6C at the same time, as the number of times the camera app is launched is increased to the default value, in response to the fact that the handedness status is the left-hand status, the touch screen 110 may be adjusted from displaying the default operation interface 61D to the adjusted display operation interface 61L.

In step S470, the processor 140 determines and records the frequency of use of each of the control options according to at least one user operation on the operation interface after the operation interface of the app is displayed via the touch screen 110. Whenever the user performs a touch operation on a certain control option, the frequency of use of the control option may be increased by one. In this way, as the number of times of using the app is increased, the frequency of use of each of the control options may effectively reflect the user's usage habits.

Based on the above, in an embodiment of the disclosure, when the number of times an app is launched reaches a default value, the respective display positions of the plurality of control options in the operation interface of the app may be determined according to the frequency of use of the control options. Otherwise, when the number of times the app is launched does not reach the default value, the respective display positions of the plurality of control options in the operation interface of the app may be default initial positions. In this way, when holding the mobile electronic device with one hand to take pictures or record videos, the user may smoothly control commonly used control options with one hand. Accordingly, the convenience for the user to take pictures or record videos by operating the mobile electronic device with one hand may be significantly improved.

Lastly, it should be mentioned that: each of the above embodiments is only used to describe the technical solutions of the invention and is not intended to limit the invention; and although the invention is described in detail via each of the above embodiments, those having ordinary skill in the art should understand that: modifications may still be made to the technical solutions recited in each of the above embodiments, or portions or all of the technical features thereof may be replaced to achieve the same or similar results; the modifications or replacements do not make the nature of corresponding technical solutions depart from the scope of the technical solutions of each of the embodiments of the invention.

What is claimed is:

1. An operation interface adjustment method, adapted for a mobile electronic device comprising a touch screen, the method comprising:

launching an application (app);

determining a handedness status;

determining a display position of each of a plurality of control options in an operation interface of the app according to the handedness status and a frequency of use of each of the control options of the app; and displaying the operation interface comprising the control options via a touch screen according to the display position of each of the control options in the operation interface, wherein the step of determining the display position of each of the control options in the operation interface according to the handedness status and the frequency of use of each of the control options of the app comprises:

obtaining an importance score of each of the control options when a number of times the app is launched is greater than a default value, wherein the importance score of each of the control options is determined based on the frequency of use of each of the control options; and determining the display position of each of the control options in the operation interface based on an interface display edge corresponding to the handedness status according to the importance score of each of the control options.

2. The operation interface adjustment method of claim 1, wherein the handedness status comprises a left-hand control status or a right-hand control status.

3. The operation interface adjustment method of claim 1, wherein the method further comprises:

determining and recording the frequency of use of each of the control options according to at least one user operation on the operation interface after the operation interface of the app is displayed via the touch screen.

4. The operation interface adjustment method of claim 1, wherein when the number of times the app is launched is greater than a default value, the step of obtaining the importance score of each of the control options comprises:

determining the importance score of each of the control options according to a default weight corresponding to each of the control options and the frequency of use of each of the control options.

5. The operation interface adjustment method of claim 4, wherein the importance score comprises a product of the default weight and the frequency of use.

6. The operation interface adjustment method of claim 1, wherein the step of determining the display position of each of the control options in the operation interface based on the interface display edge corresponding to the handedness status according to the importance score of each of the control options comprises:

determining that the display position of a first control option is a first layout position and the display position of a second control option is a second layout position based on the interface display edge according to a comparison result between the importance score of the first control option and the importance score of the second control option, wherein when the importance score of the first control option is greater than the importance score of the second control option, a distance between the first layout position and the interface display edge is less than a distance between the second layout position and the interface display edge.

7. The operation interface adjustment method of claim 6, wherein the step of determining the display position of each of the control options in the operation interface based on the interface display edge corresponding to the handedness status according to the importance score of each of the control options further comprises:

determining that a display position of a third control option is a third layout position and a display position of a fourth control option is a fourth layout position based on the interface display edge according to another comparison result between the importance score of the third control option and the importance score of the fourth control option, wherein the control options of the app are grouped into a plurality of control groups, the first control option and the second control option belong to a first control group in the control groups, and the third control option and the fourth control option belong to a second control group in the control groups.

8. The operation interface adjustment method of claim 7, wherein the first layout position and the second layout position are located on a first control bar of the operation interface, the third layout position and the fourth layout position are located on a second control bar of the operation interface, and a display height of the first control bar is different from a display height of the second control bar.

9. The operation interface adjustment method of claim 1, wherein the method further comprises:

determining the display position of each of the control options in the operation interface as a default initial position when the number of times the app is launched is not greater than the default value.

10. A mobile electronic device, comprising:

a touch screen;

an image capture device;

a storage device recording a plurality of commands;

a processor coupled to the touch screen, the image capture device, and the storage device, and executing the commands and configured to:

launch an app;

determine a handedness status;

determine a display position of each of a plurality of control options in an operation interface of the app according to the handedness status and a frequency of use of each of the control options of the app; and control the touch screen to display the operation interface comprising the control options according to the display position of each of the control options in the operation interface, wherein the processor is configured to:

obtain an importance score of each of the control options when a number of times the app is launched is greater than a default value, wherein the importance score of each of the control options is determined based on the frequency of use of each of the control options; and determine the display position of each of the control options in the operation interface based on an interface display edge corresponding to the handedness status according to the importance score of each of the control options.

11. The mobile electronic device of claim 10, wherein the handedness status comprises a left-hand control status or a right-hand control status.

12. The mobile electronic device of claim 10, wherein the processor is configured to:

determine and record the frequency of use of each of the control options according to at least one user operation on the operation interface after the operation interface of the app is displayed via the touch screen.

13. The mobile electronic device of claim 10, wherein the processor is configured to:

determine the importance score of each of the control options according to a default weight corresponding to each of the control options and the frequency of use of each of the control options.

14. The mobile electronic device of claim 13, wherein the importance score comprises a product of the default weight and the frequency of use.

15. The mobile electronic device of claim 10, wherein the processor is configured to:

determine that the display position of a first control option is a first layout position and the display position of a second control option is a second layout position based on the interface display edge according to a comparison result between the importance score of the first control option and the importance score of the second control option, wherein when the importance score of the first control option is greater than the importance score of the second control option, a distance between the first layout position and the interface display edge is less than a distance between the second layout position and the interface display edge.

16. The mobile electronic device of claim 15, wherein the processor is configured to:

determine that the display position of a third control option is a third layout position and the display position of a fourth control option is a fourth layout position based on the interface display edge corresponding to the handedness status according to another comparison result between an importance score of the third control option and an importance score of the fourth control option, wherein the control options of the app are grouped into a plurality of control groups, the first control option and the second control option belong to a first control group in the control groups, and the third control option and the fourth control option belong to a second control group in the control groups.

17. The mobile electronic device of claim 16, wherein the first layout position and the second layout position are located on a first control bar of the operation interface, the third layout position and the fourth layout position are located on a second control bar of the operation interface, and a display height of the first control bar is different from a display height of the second control bar.

18. The mobile electronic device of claim 16, wherein the processor is configured to:

determine the display position of each of the control options in the operation interface as a default initial position when a number of times the app is launched is not greater than the default value.

* * * * *